United States Patent
Kaushik et al.

(10) Patent No.: US 12,105,983 B2
(45) Date of Patent: *Oct. 1, 2024

(54) RESILIENT IMPLEMENTATION OF CLIENT FILE OPERATIONS AND REPLICATION

(71) Applicant: NetApp Inc., San Jose, CA (US)

(72) Inventors: Akhil Kaushik, San Jose, CA (US); Anil Kumar Ponnapur, Sunnyvale, CA (US); Aravind Srinivasa Raghavan, Santa Clara, CA (US); Manoj Kumar V Sundararajan, Sunnyvale, CA (US)

(73) Assignee: NetApp, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/459,234

(22) Filed: Aug. 31, 2023

(65) Prior Publication Data

US 2023/0409227 A1    Dec. 21, 2023

Related U.S. Application Data

(63) Continuation of application No. 17/543,351, filed on Dec. 6, 2021, now Pat. No. 11,768,624, which is a
(Continued)

(51) Int. Cl.
*G06F 3/06* (2006.01)

(52) U.S. Cl.
CPC .............. *G06F 3/065* (2013.01); *G06F 3/061* (2013.01); *G06F 3/0617* (2013.01);
(Continued)

(58) Field of Classification Search
CPC ........ G06F 3/065; G06F 3/061; G06F 3/0617; G06F 3/0619; G06F 3/0658; G06F 3/0659; G06F 3/067; G06F 3/0683
(Continued)

(56) References Cited

U.S. PATENT DOCUMENTS 7,013,379 B1    3/2006  Testardi
11,194,500 B2   12/2021 Kaushik et al.
(Continued)

OTHER PUBLICATIONS

Advisory Action mailed Nov. 22, 2017 for U.S. Appl. No. 15/008,724, filed Jan. 28, 2016, 03 pages.
(Continued)

*Primary Examiner* — Masud K Khan
*Assistant Examiner* — Zubair Ahmed
(74) *Attorney, Agent, or Firm* — Cooper Legal Group, LLC

(57) ABSTRACT

One or more techniques and/or computing devices are provided for resilient replication of storage operations. For example, a first storage controller may host first storage having a replication relationship with second storage hosted by a second storage controller. To improve resiliency against transient network issues of a network between the storage controllers, the first storage controller may implement a queue and retry mechanism to retry replication operations not acknowledge back by the second storage controller within a threshold time. The second storage controller may maintain a cumulative sequence number of a latest replication operation performed in order, an operation response map of replication operations performed out of order, and an operation finder map identifying currently implemented replication operations, which may be used to process incoming replication operations. Single write semantics, write order consistency, and reduction of write amplification may be provided.

20 Claims, 12 Drawing Sheets

Related U.S. Application Data continuation of application No. 15/008,724, filed on Jan. 28, 2016, now Pat. No. 11,194,500.

(52) U.S. Cl.
CPC .......... *G06F 3/0619* (2013.01); *G06F 3/0658* (2013.01); *G06F 3/0659* (2013.01); *G06F 3/067* (2013.01); *G06F 3/0683* (2013.01)

(58) Field of Classification Search
USPC ................................................. 711/162, 161
See application file for complete search history.

(56) References Cited

U.S. PATENT DOCUMENTS

| | | | |
|---|---|---|---|
| 2005/0154846 A1* | 7/2005 | Chen | G06F 11/2074 714/E11.107 |
| 2006/0277378 A1* | 12/2006 | Morishita | G06F 11/2071 711/162 |
| 2008/0225703 A1 | 9/2008 | Rider et al. | |
| 2012/0173830 A1 | 7/2012 | Gundy et al. | |
| 2013/0279391 A1 | 10/2013 | Gupta et al. | |
| 2015/0261443 A1 | 9/2015 | Wei et al. | |
| 2016/0098191 A1* | 4/2016 | Golden | G06F 3/0683 711/162 |
| 2016/0366216 A1 | 12/2016 | Hack et al. | |
| 2022/0091749 A1 | 3/2022 | Kaushik et al. | |

OTHER PUBLICATIONS

Final Office Action mailed on Apr. 3, 2019 for U.S. Appl. No. 15/008,724, filed Jan. 28, 2016, 17 pages.
Final Office Action mailed on Jun. 11, 2018 for U.S. Appl. No. 15/008,724, filed Jan. 28, 2016, 21 pages.
Final Office Action mailed on Sep. 11, 2017 for U.S. Appl. No. 15/008,724, filed Jan. 28, 2016, 24 pages.
Notice of Allowance mailed on May 15, 2023 for U.S. Appl. No. 17/543,351, filed Dec. 6, 2021, 14 pages.
Non-Final Office Action mailed Jan. 26, 2018 for U.S. Appl. No. 15/008,724, filed Jan. 28, 2016, 18 pages.
Non-Final Office Action mailed May 12, 2017 for U.S. Appl. No. 15/008,724, filed Jan. 28, 2016, 22 pages.
Non-Final Office Action mailed Nov. 8, 2018 for U.S. Appl. No. 15/008,724, filed Jan. 28, 2016, 17 pages.
Non-Final Office Action mailed Nov. 30, 2022 for U.S. Appl. No. 17/543,351, filed Dec. 6, 2021, 12 pages.
Notice of Allowance mailed on Aug. 6, 2021 for U.S. Appl. No. 15/008,724, filed Jan. 28, 2016, 7 pages.
International Search Report and Written Opinion for Application No. PCT/US2017/015025 mailed on May 18, 2017, 13 pages.

\* cited by examiner

RESILIENT IMPLEMENTATION OF CLIENT FILE OPERATIONS AND REPLICATION

RELATED APPLICATIONS

This application claims priority to and is a continuation of U.S. application Ser. No. 17/543,351, filed on Dec. 6, 2021, now allowed, titled "RESILIENT IMPLEMENTATION OF CLIENT FILE OPERATIONS AND REPLICATION," which claims priority to and is a continuation of U.S. application Ser. No. 15/008,724, filed on Jan. 28, 2016 and titled "RESILIENT IMPLEMENTATION OF CLIENT FILE OPERATIONS AND REPLICATION," which are incorporated herein by reference.

BACKGROUND

Many storage networks may implement data replication and/or other redundancy data access techniques for data loss protection and non-disruptive client access. For example, a first storage cluster may comprise a first storage controller configured to provide clients with primary access to data stored within a first storage device and/or other storage devices. A second storage cluster may comprise a second storage controller configured to provide clients with primary access to data stored within a second storage device and/or other storage devices. The first storage controller and the second storage controller may be configured according to a disaster recovery relationship, such that the second storage controller may provide failover access to replicated data that was replicated from the first storage device to a secondary storage device, owned by the first storage controller, but accessible to the second storage controller (e.g., a switchover operation may be performed where the second storage controller assumes ownership of the secondary storage device and/or other storage devices previously owned by the first storage controller so that the second storage controller may provide clients with failover access to replicated data within such storage devices). In an example of a logical replication scheme, the second storage controller has ownership of the replicated data. The second storage controller may provide read-only access to the replicated data. The second storage controller may convert the replicated data to full read-write access upon failover. In an example of physical replication, the storage device, comprising the replicated data, is owned by the first storage controller until a failover/switchover to the second storage controller occurs.

In an example, the second storage cluster may be located at a remote site to the first storage cluster (e.g., storage clusters may be located in different buildings, cities, thousands of kilometers from one another, etc.). Thus, if a disaster occurs at a site of a storage cluster, then a surviving storage cluster may remain unaffected by the disaster (e.g., a power outage of a building hosting the first storage cluster may not affect a second building hosting the second storage cluster in a different city).

In an example, two storage controllers within a storage cluster may be configured according to a high availability configuration, such as where the two storage controllers are locally connected to one another and/or to the same storage devices. In this way, when a storage controller fails, then a high availability partner storage controller can quickly takeover for the failed storage controller due to the local connectivity. Thus, the high availability partner storage controller may provide clients with access to data previously accessible through the failed storage controller.

In an example of a high availability configuration, high availability to data may be provided without using shared storage. In particular, high availability to data is provided using a synchronous replicated copy of a primary storage object. The high availability to data may be provided through a software defined architecture, using synchronous replication, and is not limited to merely two storage controllers.

In an example of a distributed storage environment having a cluster mode configuration, a protocol module and a storage module may be hosted within different system devices. Accordingly, operations may communicated between the protocol module and the storage module over a network interconnection for processing client requests. For example, an operation may be communicated between a first storage controller, hosting the protocol module, and a second storage controller, hosting the data module, for processing a client request.

Various replication and synchronization techniques may be used to replicate data (e.g., client data), configuration data (e.g., a size of a volume, a name of a volume, etc.), and/or write caching data (e.g., cached storage operations) between storage controllers and/or storage devices. In an example of synchronization, a synchronous replication relationship may be implemented between the first storage controller and the second storage controller, such that an incoming storage operation to the first storage controller is locally implemented upon a first storage object (e.g., a file, a logical unit number (LUN), a LUN spanning multiple volumes, or any other type of object) by the first storage controller and remotely implemented upon a second storage object (e.g., maintained as a fully synchronized copy of the first storage object) by the second storage controller before an acknowledgement is provided back to a client that sent the incoming storage operation. Unfortunately, a network, connecting the storage controllers (e.g., a network interconnect between primary storage or a protocol tier and secondary storage or a storage tier), may be unreliable, and thus may experience transient network issues that may cause replicated copies of data to become out of sync. For example, port switching, congestion, and packet loss can be caused from multiple hops, physical switches, ports, etc. experience issues. Thus, improved resiliency to transient failures of a distributed network where multiple copies of data are stored in a distributed manner is needed. Also, resiliency is improved between the first storage controller, hosting the protocol module, and the second storage controller, hosting the data module, for improved client request processing.

DETAILED DESCRIPTION

Figure 1:
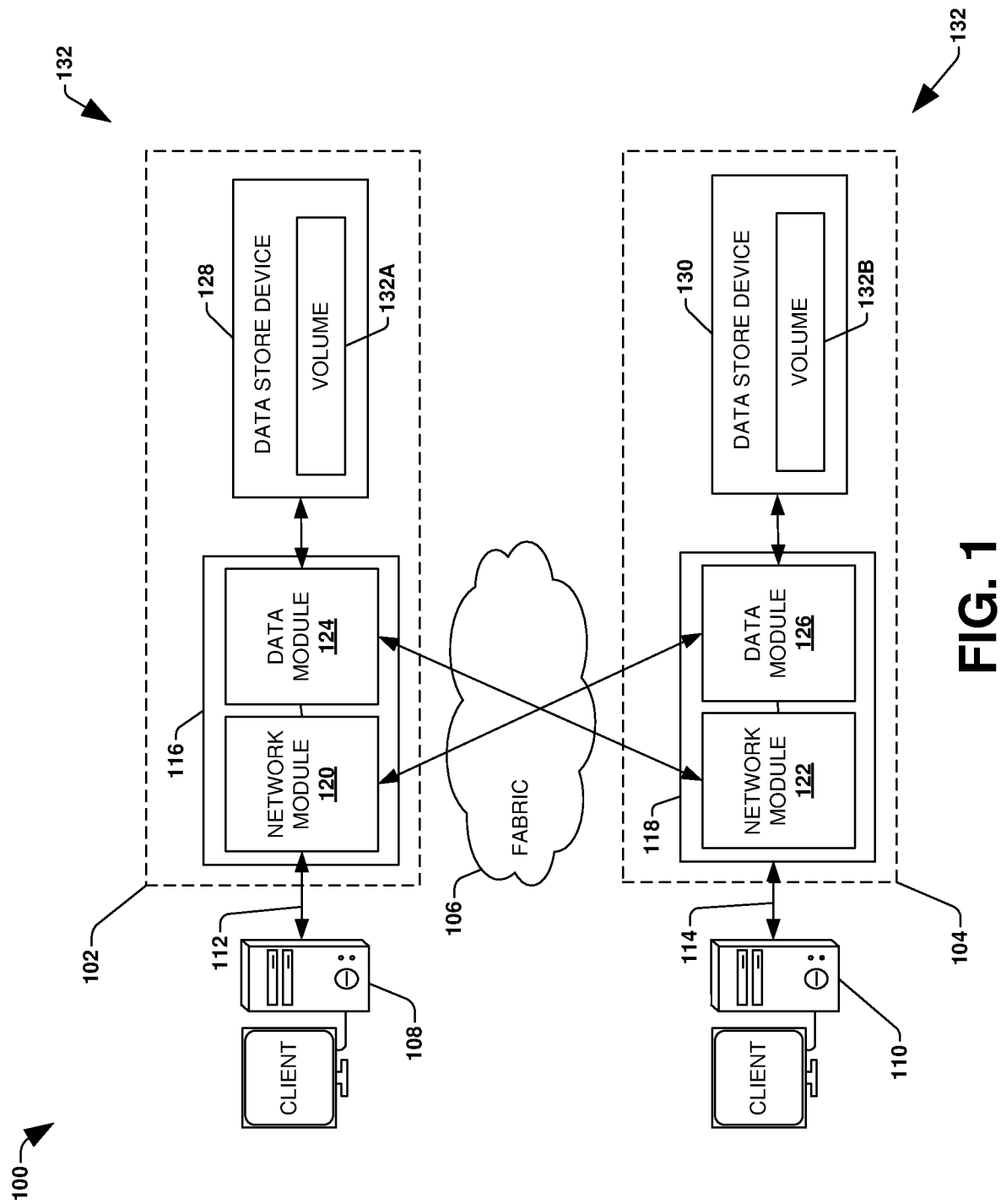
FIG. 1 is a component block diagram illustrating an example clustered network in accordance with one or more of the provisions set forth herein.

Some examples of the claimed subject matter are now described with reference to the drawings, where like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. Nothing in this detailed description is admitted as prior art.

One or more techniques and/or computing devices for resilient replication of storage operations are provided herein. In an example, a replication relationship is established between first storage, hosted by a first storage controller, and second storage hosted by a second storage controller (e.g., a replication relationship at a granularity of a file, LUN, consistency group, subdirectory, etc.). It may be appreciated that any number of replication relationships may be established from the first storage to other storage distributed within a network. A storage operation, received by the first storage controller for implementation upon the first storage, may be split into a replication operation that is sent to the second storage controller for remote implementation upon the second storage based upon the replication relationship. To improve resiliency of replicating storage operation, such as resiliency against transient network issues, the first storage controller may implement a queue and retry mechanism to track and retry replication operations. The second storage controller may maintain a cumulative sequence number used to track a latest replication operation implemented in order, an operation response map used to track replication operations implemented out of order with respect to the cumulative sequence number, and an operation finder map used to track replication operations currently being implemented.

Accordingly, when a replication operation is received by the second storage controller from the first storage controller, the cumulative sequence number, the operation response map, and/or the operation finder map may be used to determine how to implement and/or respond back to the first storage controller for the replication operation. In this way, failed replication operations may be retried, single write semantics may be enforced for the second storage to mitigate the writing of stale data to the second storage (e.g., when an initial replication operation and one or more retry replication operations are sent to the second storage controller, the first received replication operation is implemented and any subsequent replication operations are terminated), and write amplification may be mitigated where resources may otherwise be wasted in implementing redundant replication operations upon the second storage. Error handling, cleanup actions, and/or resource allocation adjustments may be performed based upon a difference or gap between a latest sequentially processed replication operation and a maximum processed replication operation.

To provide context for resilient replication of storage operations, FIG. 1 illustrates an embodiment of a clustered network environment 100 or a network storage environment. It may be appreciated, however, that the techniques, etc. described herein may be implemented within the clustered network environment 100, a non-cluster network environment, and/or a variety of other computing environments, such as a desktop computing environment. That is, the instant disclosure, including the scope of the appended claims, is not meant to be limited to the examples provided herein. It will be appreciated that where the same or similar components, elements, features, items, modules, etc. are illustrated in later figures but were previously discussed with regard to prior figures, that a similar (e.g., redundant) discussion of the same may be omitted when describing the subsequent figures (e.g., for purposes of simplicity and ease of understanding).

FIG. 1 is a block diagram illustrating the clustered network environment 100 that may implement at least some embodiments of the techniques and/or systems described herein. The clustered network environment 100 comprises data storage systems 102 and 104 that are coupled over a cluster fabric 106, such as a computing network embodied as a private Infiniband, Fibre Channel (FC), or Ethernet network facilitating communication between the data storage systems 102 and 104 (and one or more modules, component, etc. therein, such as, nodes 116 and 118, for example). It will be appreciated that while two data storage systems 102 and 104 and two nodes 116 and 118 are illustrated in FIG. 1, that any suitable number of such components is contemplated. In an example, nodes 116, 118 comprise storage controllers (e.g., node 116 may comprise a primary or local storage controller and node 118 may comprise a secondary or remote storage controller) that provide client devices, such as host devices 108, 110, with access to data stored within data storage devices 128, 130. Similarly, unless specifically provided otherwise herein, the same is true for other modules, elements, features, items, etc. referenced herein and/or illustrated in the accompanying drawings. That is, a particular number of components, modules, elements, features, items, etc. disclosed herein is not meant to be interpreted in a limiting manner.

It will be further appreciated that clustered networks are not limited to any particular geographic areas and can be clustered locally and/or remotely. Thus, in one embodiment a clustered network can be distributed over a plurality of storage systems and/or nodes located in a plurality of geographic locations; while in another embodiment a clustered network can include data storage systems (e.g., 102, 104) residing in a same geographic location (e.g., in a single onsite rack of data storage devices).

In the illustrated example, one or more host devices 108, 110 which may comprise, for example, client devices, personal computers (PCs), computing devices used for storage (e.g., storage servers), and other computers or peripheral devices (e.g., printers), are coupled to the respective data storage systems 102, 104 by storage network connections 112, 114. Network connection may comprise a local area network (LAN) or wide area network (WAN), for example, that utilizes Network Attached Storage (NAS) protocols, such as a Common Internet File System (CIFS) protocol or a Network File System (NFS) protocol to exchange data packets, a Storage Area Network (SAN) protocol, such as Small Computer System Interface (SCSI) or Fiber Channel Protocol (FCP), an object protocol, such as S3, etc. Illustratively, the host devices 108, 110 may be general-purpose computers running applications, and may interact with the data storage systems 102, 104 using a client/server model for exchange of information. That is, the host device may request data from the data storage system (e.g., data on a storage device managed by a network storage control configured to process I/O commands issued by the host device for the storage device), and the data storage system may return results of the request to the host device via one or more storage network connections 112, 114.

The nodes 116, 118 on clustered data storage systems 102, 104 can comprise network or host nodes that are interconnected as a cluster to provide data storage and management services, such as to an enterprise having remote locations, cloud storage (e.g., a storage endpoint may be stored within a data cloud), etc., for example. Such a node in the clustered network environment 100 can be a device attached to the network as a connection point, redistribution point or communication endpoint, for example. A node may be capable of sending, receiving, and/or forwarding information over a network communications channel, and could comprise any device that meets any or all of these criteria. One example of a node may be a data storage and management server attached to a network, where the server can comprise a general purpose computer or a computing device particularly configured to operate as a server in a data storage and management system.

In an example, a first cluster of nodes such as the nodes 116, 118 (e.g., a first set of storage controllers configured to provide access to a first storage aggregate comprising a first logical grouping of one or more storage devices) may be located on a first storage site. A second cluster of nodes, not illustrated, may be located at a second storage site (e.g., a second set of storage controllers configured to provide access to a second storage aggregate comprising a second logical grouping of one or more storage devices). The first cluster of nodes and the second cluster of nodes may be configured according to a disaster recovery configuration where a surviving cluster of nodes provides switchover access to storage devices of a disaster cluster of nodes in the event a disaster occurs at a disaster storage site comprising the disaster cluster of nodes (e.g., the first cluster of nodes provides client devices with switchover data access to storage devices of the second storage aggregate in the event a disaster occurs at the second storage site).

As illustrated in the clustered network environment 100, nodes 116, 118 can comprise various functional components that coordinate to provide distributed storage architecture for the cluster. For example, the nodes can comprise network modules 120, 122 and data modules 124, 126. Network modules 120, 122 can be configured to allow the nodes 116, 118 (e.g., network storage controllers) to connect with host devices 108, 110 over the storage network connections 112, 114, for example, allowing the host devices 108, 110 to access data stored in the distributed storage system. Further, the network modules 120, 122 can provide connections with one or more other components through the cluster fabric 106. For example, in FIG. 1, the network module 120 of node 116 can access a second data storage device 130 by sending a request through the data module 126 of a second node 118.

Data modules 124, 126 can be configured to connect one or more data storage devices 128, 130, such as disks or arrays of disks, flash memory, or some other form of data storage, to the nodes 116, 118. The nodes 116, 118 can be interconnected by the cluster fabric 106, for example, allowing respective nodes in the cluster to access data on data storage devices 128, 130 connected to different nodes in the cluster. Often, data modules 124, 126 communicate with the data storage devices 128, 130 according to the SAN protocol, such as SCSI or FCP, for example. Thus, as seen from an operating system on nodes 116, 118, the data storage devices 128, 130 can appear as locally attached to the operating system. In this manner, different nodes 116, 118, etc. may access data blocks through the operating system, rather than expressly requesting abstract files.

It should be appreciated that, while the clustered network environment 100 illustrates an equal number of network and data modules, other embodiments may comprise a differing number of these modules. For example, there may be a plurality of network and data modules interconnected in a cluster that does not have a one-to-one correspondence between the network and data modules. That is, different nodes can have a different number of network and data modules, and the same node can have a different number of network modules than data modules.

Further, a host device 108, 110 can be networked with the nodes 116, 118 in the cluster, over the storage networking connections 112, 114. As an example, respective host devices 108, 110 that are networked to a cluster may request services (e.g., exchanging of information in the form of data packets) of nodes 116, 118 in the cluster, and the nodes 116, 118 can return results of the requested services to the host devices 108, 110. In one embodiment, the host devices 108, 110 can exchange information with the network modules 120, 122 residing in the nodes 116, 118 (e.g., network hosts) in the data storage systems 102, 104.

In one embodiment, the data storage devices 128, 130 comprise volumes 132, which is an implementation of storage of information onto disk drives or disk arrays or other storage (e.g., flash) as a file-system for data, for example. Volumes can span a portion of a disk, a collection of disks, or portions of disks, for example, and typically define an overall logical arrangement of file storage on disk space in the storage system. In one embodiment a volume can comprise stored data as one or more files that reside in a hierarchical directory structure within the volume.

Volumes are typically configured in formats that may be associated with particular storage systems, and respective volume formats typically comprise features that provide functionality to the volumes, such as providing an ability for volumes to form clusters. For example, where a first storage system may utilize a first format for their volumes, a second storage system may utilize a second format for their volumes.

In the clustered network environment 100, the host devices 108, 110 can utilize the data storage systems 102, 104 to store and retrieve data from the volumes 132. In this embodiment, for example, the host device 108 can send data packets to the network module 120 in the node 116 within data storage system 102. The node 116 can forward the data to the data storage device 128 using the data module 124, where the data storage device 128 comprises volume 132A. In this way, in this example, the host device can access the volume 132A, to store and/or retrieve data, using the data storage system 102 connected by the network connection 112. Further, in this embodiment, the host device 110 can exchange data with the network module 122 in the host 118 within the data storage system 104 (e.g., which may be remote from the data storage system 102). The host 118 can forward the data to the data storage device 130 using the data module 126, thereby accessing volume 132B associated with the data storage device 130.

It may be appreciated that resilient replication of storage operations may be implemented within the clustered network environment 100. In an example, a replication relationship may be established between the volume 132A (e.g., or a subset of the volume 132A, such as a file, LUN, subdirectory, or any other type of storage object) of node 116 (e.g., a first storage controller), the volume 132B (e.g., or a subset of the volume 132B, such as a file, LUN, subdirectory, or any other type of storage object) of the node 118 (e.g., a second storage controller), and/or any other number of replication storage objects. The node 116 may implement a queue and/or retry mechanism for replication operations. The node 118 may evaluate and process replication operations using a cumulative sequence number, an operation response map, and/or an operation finder map. It may be appreciated that resilient replication of storage operations may be implemented for and/or between any type of computing environment, and may be transferrable between physical devices (e.g., node 116, node 118, a desktop computer, a tablet, a laptop, a wearable device, a mobile device, a storage device, a server, etc.) and/or a cloud computing environment (e.g., remote to the clustered network environment 100).

Figure 2:
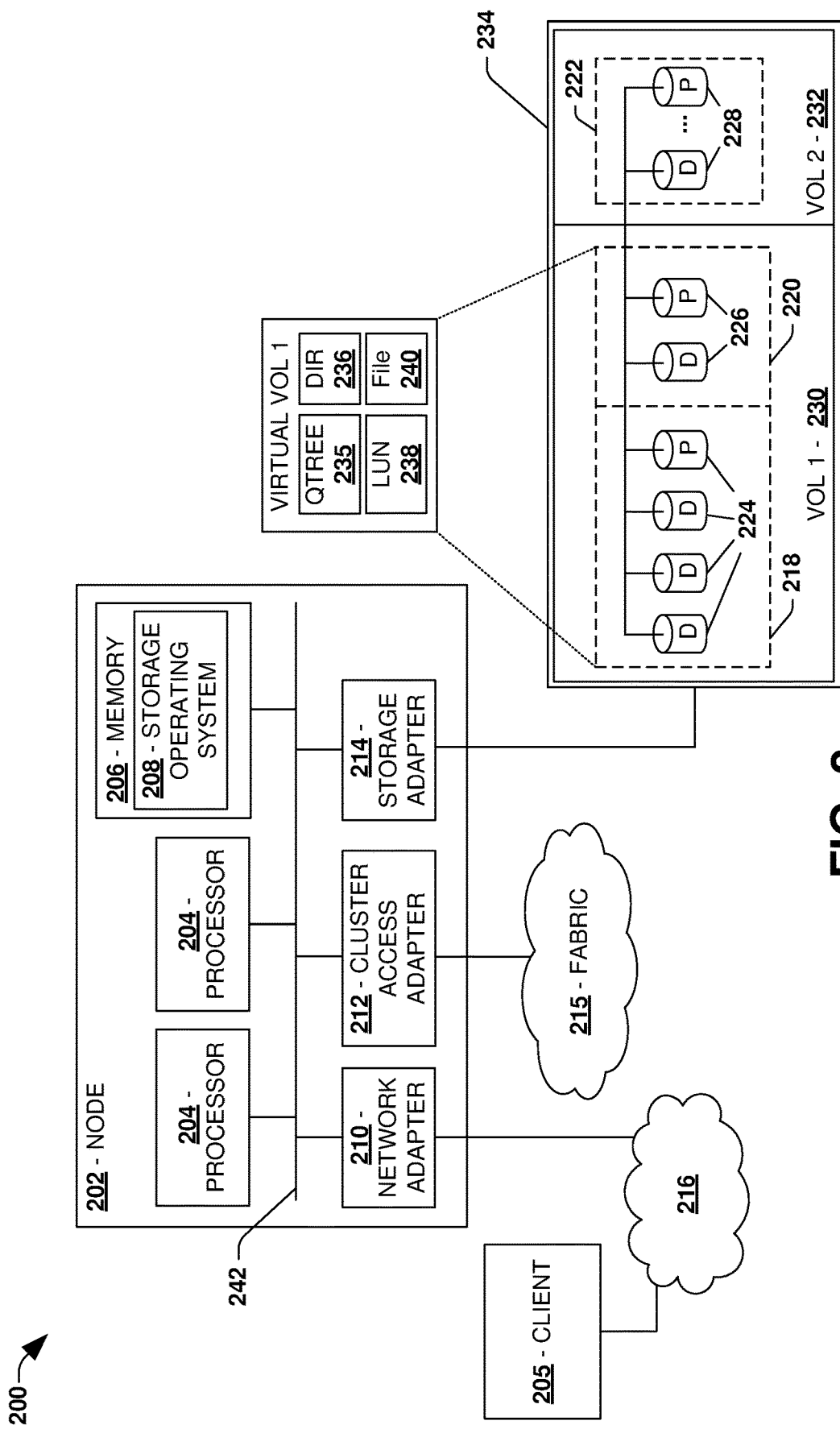
FIG. 2 is a component block diagram illustrating an example data storage system in accordance with one or more of the provisions set forth herein.

FIG. 2 is an illustrative example of a data storage system 200 (e.g., 102, 104 in FIG. 1), providing further detail of an embodiment of components that may implement one or more of the techniques and/or systems described herein. The data storage system 200 comprises a node 202 (e.g., host nodes 116, 118 in FIG. 1), and a data storage device 234 (e.g., data storage devices 128, 130 in FIG. 1). The node 202 may be a general purpose computer, for example, or some other computing device particularly configured to operate as a storage server. A host device 205 (e.g., 108, 110 in FIG. 1) can be connected to the node 202 over a network 216, for example, to provides access to files and/or other data stored on the data storage device 234. In an example, the node 202 comprises a storage controller that provides client devices, such as the host device 205, with access to data stored within data storage device 234.

The data storage device 234 can comprise mass storage devices, such as disks 224, 226, 228 of a disk array 218, 220, 222. It will be appreciated that the techniques and systems, described herein, are not limited by the example embodiment. For example, disks 224, 226, 228 may comprise any type of mass storage devices, including but not limited to magnetic disk drives, flash memory, and any other similar media adapted to store information, including, for example, data (D) and/or parity (P) information.

The node 202 comprises one or more processors 204, a memory 206, a network adapter 210, a cluster access adapter 212, and a storage adapter 214 interconnected by a system bus 242. The data storage system 200 also includes an operating system 208 installed in the memory 206 of the node 202 that can, for example, implement a Redundant Array of Independent (or Inexpensive) Disks (RAID) optimization technique to optimize a reconstruction process of data of a failed disk in an array.

The operating system 208 can also manage communications for the data storage system, and communications between other data storage systems that may be in a clustered network, such as attached to a cluster fabric 215 (e.g., 106 in FIG. 1). Thus, the node 202, such as a network storage controller, can respond to host device requests to manage data on the data storage device 234 (e.g., or additional clustered devices) in accordance with these host device requests. The operating system 208 can often establish one or more file systems on the data storage system 200, where a file system can include software code and data structures that implement a persistent hierarchical namespace of files and directories, for example. As an example, when a new data storage device (not shown) is added to a clustered network system, the operating system 208 is informed where, in an existing directory tree, new files associated with the new data storage device are to be stored. This is often referred to as "mounting" a file system.

In the example data storage system 200, memory 206 can include storage locations that are addressable by the processors 204 and network adapters 210, 212, 214 for storing related software application code and data structures. The processors 204 and network adapters 210, 212, 214 may, for example, include processing elements and/or logic circuitry configured to execute the software code and manipulate the data structures. The operating system 208, portions of which are typically resident in the memory 206 and executed by the processing elements, functionally organizes the storage system by, among other things, invoking storage operations in support of a file service implemented by the storage system. It will be apparent to those skilled in the art that other processing and memory mechanisms, including various computer readable media, may be used for storing and/or executing application instructions pertaining to the techniques described herein. For example, the operating system can also utilize one or more control files (not shown) to aid in the provisioning of virtual machines.

The network adapter 210 includes the mechanical, electrical and signaling circuitry needed to connect the data storage system 200 to a host device 205 over a network 216, which may comprise, among other things, a point-to-point connection or a shared medium, such as a local area network. The host device 205 (e.g., 108, 110 of FIG. 1) may be a general-purpose computer configured to execute applications. As described above, the host device 205 may interact with the data storage system 200 in accordance with a client/host model of information delivery.

The storage adapter 214 cooperates with the operating system 208 executing on the node 202 to access information requested by the host device 205 (e.g., access data on a storage device managed by a network storage controller). The information may be stored on any type of attached array of writeable media such as magnetic disk drives, flash memory, and/or any other similar media adapted to store information. In the example data storage system 200, the information can be stored in data blocks on the disks 224, 226, 228. The storage adapter 214 can include input/output (I/O) interface circuitry that couples to the disks over an I/O interconnect arrangement, such as a storage area network (SAN) protocol (e.g., Small Computer System Interface (SCSI), iSCSI, hyperSCSI, Fiber Channel Protocol (FCP)). The information is retrieved by the storage adapter 214 and, if necessary, processed by the one or more processors 204 (or the storage adapter 214 itself) prior to being forwarded over the system bus 242 to the network adapter 210 (and/or the cluster access adapter 212 if sending to another node in the cluster) where the information is formatted into a data packet and returned to the host device 205 over the network 216 (and/or returned to another node attached to the cluster over the cluster fabric 215).

In one embodiment, storage of information on disk arrays 218, 220, 222 can be implemented as one or more storage volumes 230, 232 that are comprised of a cluster of disks 224, 226, 228 defining an overall logical arrangement of disk space. The disks 224, 226, 228 that comprise one or more volumes are typically organized as one or more groups of RAIDs. As an example, volume 230 comprises an aggregate of disk arrays 218 and 220, which comprise the cluster of disks 224 and 226.

In one embodiment, to facilitate access to disks 224, 226, 228, the operating system 208 may implement a file system (e.g., write anywhere file system) that logically organizes the information as a hierarchical structure of directories and files on the disks. In this embodiment, respective files may be implemented as a set of disk blocks configured to store information, whereas directories may be implemented as specially formatted files in which information about other files and directories are stored.

Whatever the underlying physical configuration within this data storage system 200, data can be stored as files within physical and/or virtual volumes, which can be associated with respective volume identifiers, such as file system identifiers (FSIDs), which can be 32-bits in length in one example.

A physical volume corresponds to at least a portion of physical storage devices whose address, addressable space, location, etc. doesn't change, such as at least some of one or more data storage devices 234 (e.g., a Redundant Array of Independent (or Inexpensive) Disks (RAID system)). Typically the location of the physical volume doesn't change in that the (range of) address(es) used to access it generally remains constant.

A virtual volume, in contrast, is stored over an aggregate of disparate portions of different physical storage devices. The virtual volume may be a collection of different available portions of different physical storage device locations, such as some available space from each of the disks 224, 226, and/or 228. It will be appreciated that since a virtual volume is not "tied" to any one particular storage device, a virtual volume can be said to include a layer of abstraction or virtualization, which allows it to be resized and/or flexible in some regards.

Further, a virtual volume can include one or more logical unit numbers (LUNs) 238, directories 236, Qtrees 235, and files 240. Among other things, these features, but more particularly LUNS, allow the disparate memory locations within which data is stored to be identified, for example, and grouped as data storage unit. As such, the LUNs 238 may be characterized as constituting a virtual disk or drive upon which data within the virtual volume is stored within the aggregate. For example, LUNs are often referred to as virtual drives, such that they emulate a hard drive from a general purpose computer, while they actually comprise data blocks stored in various parts of a volume.

In one embodiment, one or more data storage devices 234 can have one or more physical ports, wherein each physical port can be assigned a target address (e.g., SCSI target address). To represent respective volumes stored on a data storage device, a target address on the data storage device can be used to identify one or more LUNs 238. Thus, for example, when the node 202 connects to a volume 230, 232 through the storage adapter 214, a connection between the node 202 and the one or more LUNs 238 underlying the volume is created.

In one embodiment, respective target addresses can identify multiple LUNs, such that a target address can represent multiple volumes. The I/O interface, which can be implemented as circuitry and/or software in the storage adapter 214 or as executable code residing in memory 206 and executed by the processors 204, for example, can connect to volume 230 by using one or more addresses that identify the one or more LUNs 238.

It may be appreciated that resilient replication of storage operations may be implemented for the data storage system 200. In an example, a synchronous replication relationship may be established between the volume 230 (e.g., or a subset of the volume 230, such as the file 240, the LUN 238, a subdirectory, or any other type of storage object) of the node 202 (e.g., a first storage controller) and any other number of replication storage objects hosted by storage controllers. The node 202 may implement a queue and/or retry mechanism for replication operations. A second node (e.g., a second storage controller) may evaluate and process replication operations using a cumulative sequence number, an operation response map, and/or an operation finder map. It may be appreciated that resilient replication of storage operations may be implemented for and/or between any type of computing environment, and may be transferrable between physical devices (e.g., node 202, host device 205, a desktop computer, a tablet, a laptop, a wearable device, a mobile device, a storage device, a server, etc.) and/or a cloud computing environment (e.g., remote to the node 202 and/or the host device 205).

Figure 3:
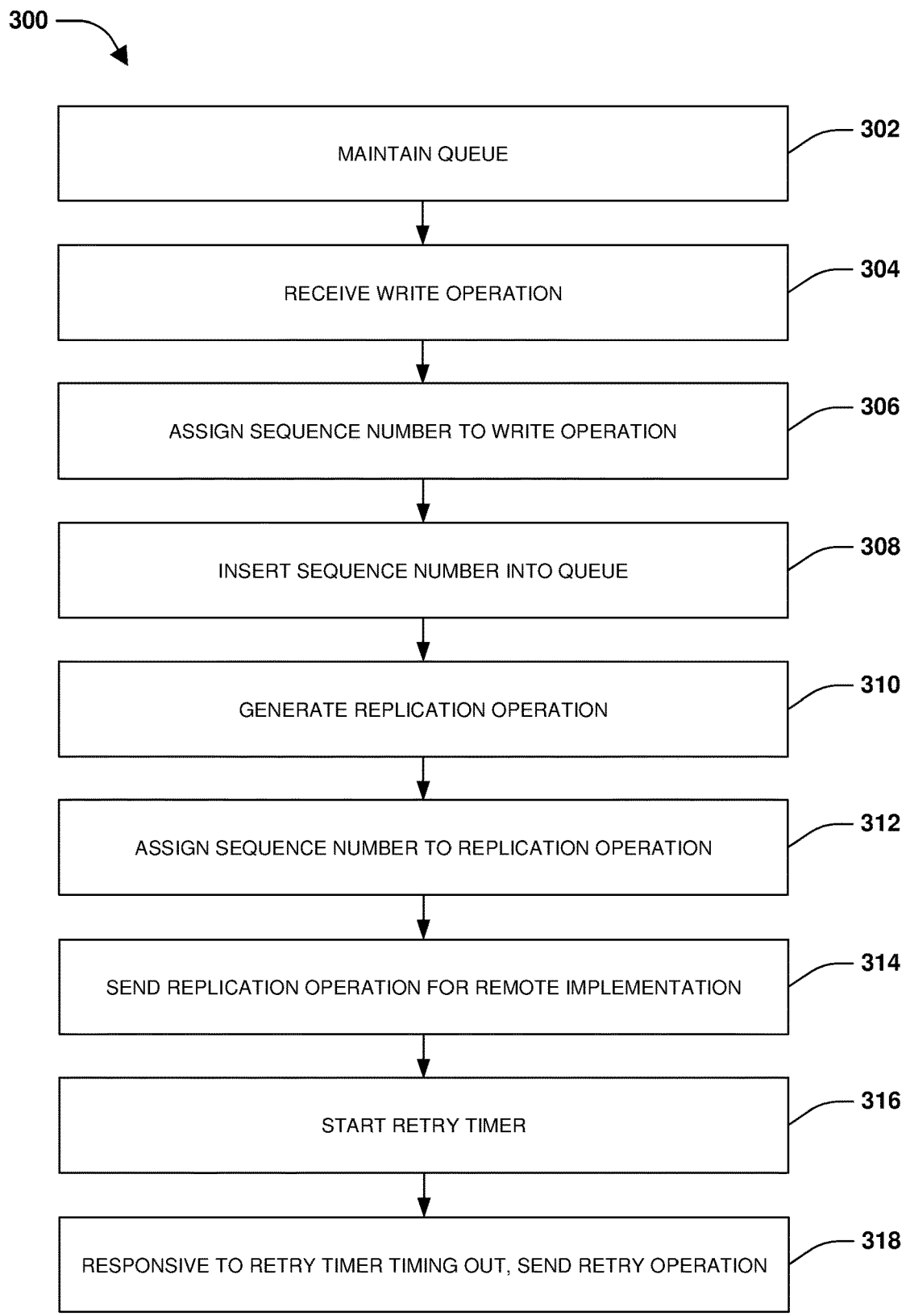
FIG. 3 is a flow chart illustrating an exemplary method of resilient replication of storage operations.

One embodiment of resilient replication of storage operations is illustrated by an exemplary method 300 of FIG. 3. A first storage controller may be associated with primary storage and/or a protocol tier. A second storage controller may be associated with secondary storage and/or a storage tier. The first storage controller and the second storage controller may be within the same local storage site or may be within different storage sites remote to one another. The first storage controller and the second storage controller may be connected by a network (e.g., a distributed environment where multiple copies of application data are distributed by multiple nodes connected on LAN or over WAN and are accessible using various types of protocols such as NFS, SCSI, CIFS, etc.). Unfortunately, the network may experience transient issues, such as port switching, congestion, and/or packet loss due to issues from multiple hops, physical switches, ports, etc. Accordingly, as provided herein, resiliency replicating storage operations may be improved.

The first storage controller may host first storage (e.g., a file, a LUN, a LUN spanning across multiple volumes, a subdirectory within the volume, and/or any other type of object used to store data). The second storage controller may host second storage that is used as a backup replication of the first storage. It may be appreciated that any number of storage and/or storage controllers may be used as backup replications of the first storage.

At 302, the first storage controller may maintain a queue for pending storage operations (e.g., write operations and metadata operations such as a modification of a LUN, a volume name change, a volume resize, an access permission change, etc.) that are to be locally implemented by the first storage controller upon the first storage and remotely replicated to the second storage controller for implementation upon the second storage based upon a replication relationship between the first storage and the second storage. Storage operations, targeting the first storage, are replicated to the second storage so that the second storage is data consistent with the first storage. Resiliency of replicating the storage operations can improve the ability to maintain data consistency between the first storage and the second storage. Providing resiliency minimizes zero recovery point objective (RPO) outage, which is valuable for synchronous replication because otherwise a synchronous replication relationship may be forced to go out of sync and thereby causing outage to zero RPO protection.

At 304, a storage operation may be received from a client. At 306, the storage operation may be assigned a sequence number (e.g., a unique identifier; a last assigned sequence number to a prior storage operation may be incremented to create the sequence number; etc.). The sequence number may be assigned to replication operations (e.g., an original replication operation and/or one or more retry replication operations that are created to retry the original replication operation when an acknowledgement has not been received within a threshold time from the second storage controller that the original replication operation or a retry replication operation completed). At 308, the sequence number may be inserted into the queue, used to track storage operations that have not yet been acknowledged as successful by the second storage controller, so that the first storage controller can track the storage operation (e.g., the sequence number may be removed from the queue upon receipt of an acknowledgment that the original replication operation or a retry replication operation has been completed by the second storage controller).

At 310, a replication operation (e.g., the original replication operation) may be generated based upon the storage operation. In an example, a reference, to data associated with the storage operation (e.g., new data that is to be written to the first storage by the storage operation), may be utilized to associate the data with the replication operation utilizing a non-copy operation (e.g., a zero-copy operation). At 312, the sequence number may be assigned to the replication operation because the replication operation is a replication of the storage operation. At 314, the replication operation is sent to the second storage controller for remote implementation upon the second storage.

At 316, a retry timer for the replication operation may be started because transient network issues and/or other failures (e.g., communication loss, a storage controller failure, etc.) may result in the replication operation not being implemented by the second storage controller. At 318, responsive to the retry timer timing out before an acknowledgment is received from the second storage controller that the replication operation succeeded, a retry replication operation, of the original replication operation, may be sent to the second storage controller for implementation. The retry replication operation may be assigned the sequence number of the storage operation and the replication operation. It may be appreciated that any number of retry replication operations may be generated (e.g., the retry timer may be reset after the retry replication operation is sent, and thus a second retry replication operation may be sent upon a second timeout of the retry timer).

Responsive to locally implementing the storage operation and receiving an acknowledgement that the original replication operation or a retry replication operation succeeded, the first storage controller may remove the sequence number from the queue and respond with an acknowledgement of success to the client.

A protocol timer may be started for the replication operation (e.g., less than a minute timer or any other time for NFS; a 5 minute timer or any other time for SAN; etc.) to ensure protocol timeout guarantees are met. Responsive to the protocol timer timing out before a success acknowledgment is received from the second storage controller for the sequence number (e.g., before an acknowledgement that the original replication operation or the retry replication operation succeeded), the synchronous replication relationship is taken out of sync. Failure to receive an acknowledgment from the second storage controller does not result in a failure response to a client because the client response depends on a response from a file system of the first storage controller regarding the implementation of the storage operation. Protocol timeout expiry results in the synchronous replication relationship being taken out of sync, while responses for pending/queued storage operations are generated based upon responses from the file system regarding local implementation of storage operations. Protocol timeout guarantees can be achieved efficiently by inspecting a queued element at a head of the queue because there may be a single timeout maintained for all storage operations and storage operations are inserted into the queue in the order of arrival thus providing for a time ordered queue.

Figure 4:
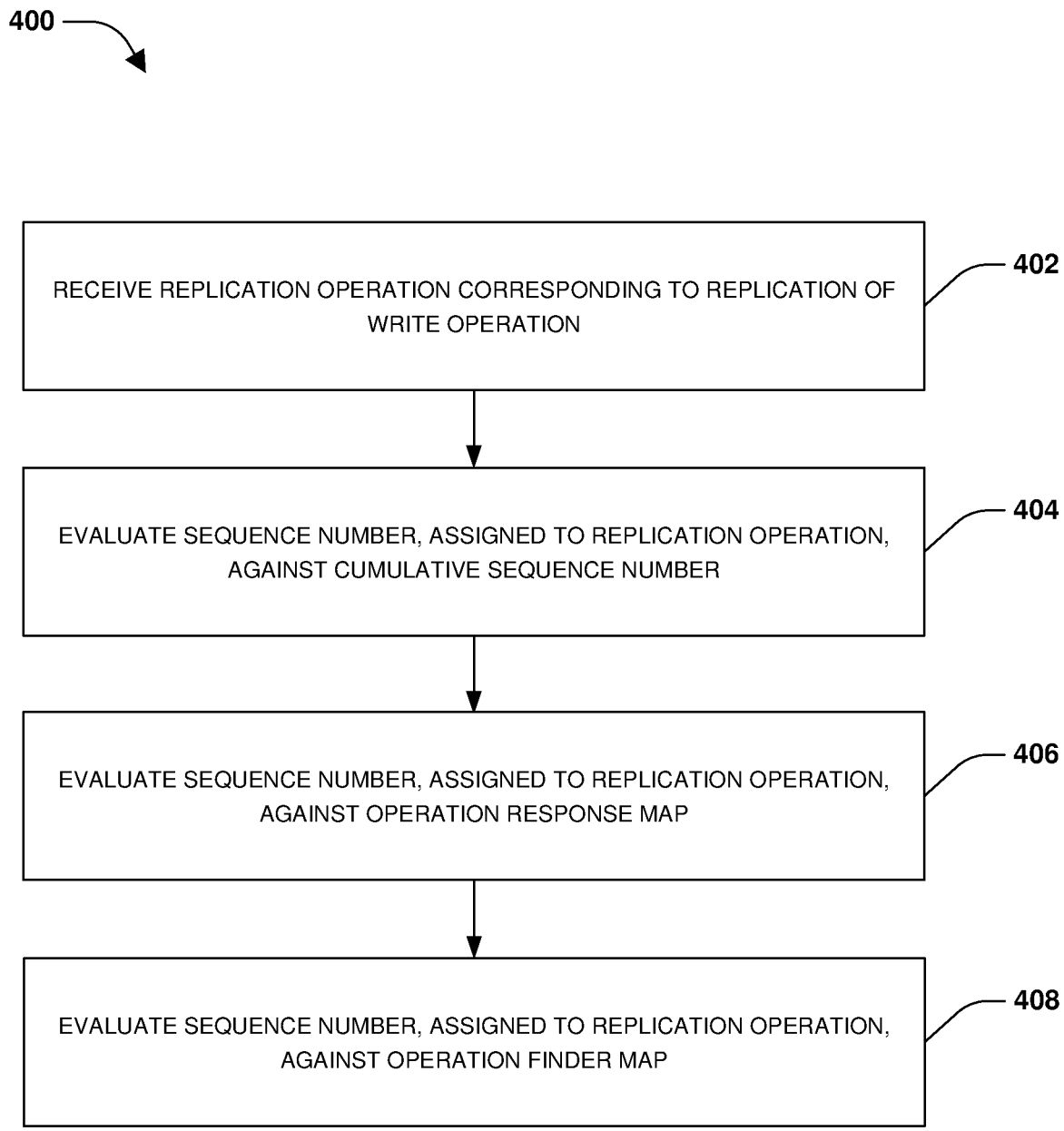
FIG. 4 is a flow chart illustrating an exemplary method of resilient replication of storage operations.

One embodiment of resilient replication of storage operations is illustrated by an exemplary method 400 of FIG. 4. A first storage controller may host first storage (e.g., a file, a LUN, a LUN spanning across multiple volumes, a subdirectory within the volume, and/or any other type of object used to store data). A second storage controller may host second storage that is used as a backup replication of the first storage. The first storage controller and the second storage controller may be within the same local storage site or may be within different storage sites remote to one another. The first storage controller and the second storage controller may be connected by a network (e.g., a distributed environment where multiple copies of application data are distributed by multiple nodes). Unfortunately, the network may experience transient issues, such as port switching, congestion, and/or packet loss due to issues from multiple hops, physical switches, ports, etc. Accordingly, as provided herein, resiliency replicating storage operations may be improved.

At 402, a replication operation may be received from the first storage controller by the second storage controller. The replication operation may correspond to a replication of a storage operation received by the first storage controller for implementation upon the first storage. The replication operation may target the second storage based upon a replication relationship between the first storage and the second storage. A cumulative sequence number, an operation response map, and/or an operation finder map may be used to enforce a single write semantic for the second storage (e.g., once an instance of a replication operation, associated with the storage operation, is implemented upon the second storage, any subsequently received instances of the replication operation such as a retry replication operation may be disregarded so that stale data is not written to the second storage) and/or to enforce a write order consistency for replication operations (e.g., an order of implementing replication operations may be maintained, such as for overlapping or dependent storage operations). Because the replication operation may be an original replication operation or a retry replication of the original replication operation, the second storage controller may utilize the cumulative sequence number, the operation response map, and/or the operation finder map to determine whether the replication operation is a first received instance of a replication of the storage operation, is a redundant replication operation of an already implemented replication operation that was implemented in sequence or out of sequence, or is a redundant replication operation of a currently implemented replication operation.

At 404, a sequence number, assigned to the replication operation (e.g., a sequence number of the storage operation may be assigned to the original replication operation of the storage operation and retry replication operations that are created when a retry timer times out), may be evaluated against a cumulative sequence number. The cumulative sequence number may correspond to a latest replication operation implemented in sequence by the second storage controller. Responsive to the sequence number being less than or equal to the cumulative sequence number, the replication operation may be terminated and a response may be provided back to the first storage controller that replication operation implementation for the sequence number has already succeeded (e.g., the replication operation may be a retry replication operation of the original replication operation, for the storage operation, already implemented by the second storage controller in sequential order).

Responsive to the sequence number being greater than the cumulative sequence number, the sequence number may be evaluated against an operation response map (e.g., a data structure used to track replication operations, such as the original replication operation or a retry replication operation, implemented by the second storage controller out of sequence with respect to the cumulative sequence number), at 406. For example, responsive to the sequence number being specified within the operation response map, the replication operation may be terminated and a response may be provided back to the first storage controller that replication operation implementation for the sequence number has already succeeded (e.g., the replication operation may be a retry replication operation of the original replication operation, for the storage operation, already implemented by the second storage controller out of sequence with respect to the cumulative sequence number).

Responsive to the sequence number not being specified within the operation response map, the sequence number may be evaluated against an operation finder map (e.g., a data structure used to track replication operations, such as the original replication operation or a retry replication operation, currently being implemented by the second storage controller), at 408. For example, responsive to the sequence number being associated with an entry within the operation finder map (e.g., another replication operation such as the original replication operation or a retry replication operation, having the same sequence number and thus also being a replication of the storage operation, may be currently being implemented by the second storage controller), a context of the replication operation may be added to the entry. In an example, the context may specify that the replication operation is a retry replication operation by the first storage controller of an original replication operation or a prior received replication operation currently being implemented by the second storage controller upon the second storage. Thus, responsive to the original replication operation or the prior received replication operation completing, a response may be provided back to the first storage controller, based upon the entry and the context, that replication operation implementation, corresponding to the replication operation and the completed replication operation, for the sequence number has succeeded. Accordingly, the entry may be removed from the operation finder map. The first storage controller may remove the sequence number from a queue, and may respond back with a success acknowledgment to a client that submitted the storage operation.

Responsive to the sequence number not being associated with at least one entry within the operation finder map (e.g., the replication operation is a first replication operation, having the sequence number of the storage operation, received by the second storage controller, and thus should be implemented by the second storage controller), a new entry of the sequence number may be added into the operation finder map. Accordingly, the replication operation may be implemented upon the second storage.

In an example, a current replication operation may be determined as being completed by the second storage controller upon the second storage. Responsive to a current sequence number of the current replication operation being next in sequence to the cumulative sequence number, the cumulative sequence number may be incremented. Responsive to the current sequence number of the current replication operation not being next in sequence to the cumulative sequence number, the current sequence number may be added to the operation response map because the current replication operation was not completed in order.

In an example, a gap between a latest sequentially processed sequence number (e.g., the cumulative sequence number), of a latest in order processed replication operation by the second storage controller, and a maximum sequence number of replication operations processed by the second storage controller may be identified. A memory footprint, utilized for replication operations, may be identified based upon the gap (e.g., out of sequence replication operations being stored in memory until ready for sequential commitment). Resources, provisioned for implementing replication operations, may be adjusted based upon the gap (e.g., more resources may be allocated as the gap increases in order to subsequently reduce the gap). Responsive to the gap exceeding a threshold, a cleanup action or erroring handling may be performed.

Figure 5A:
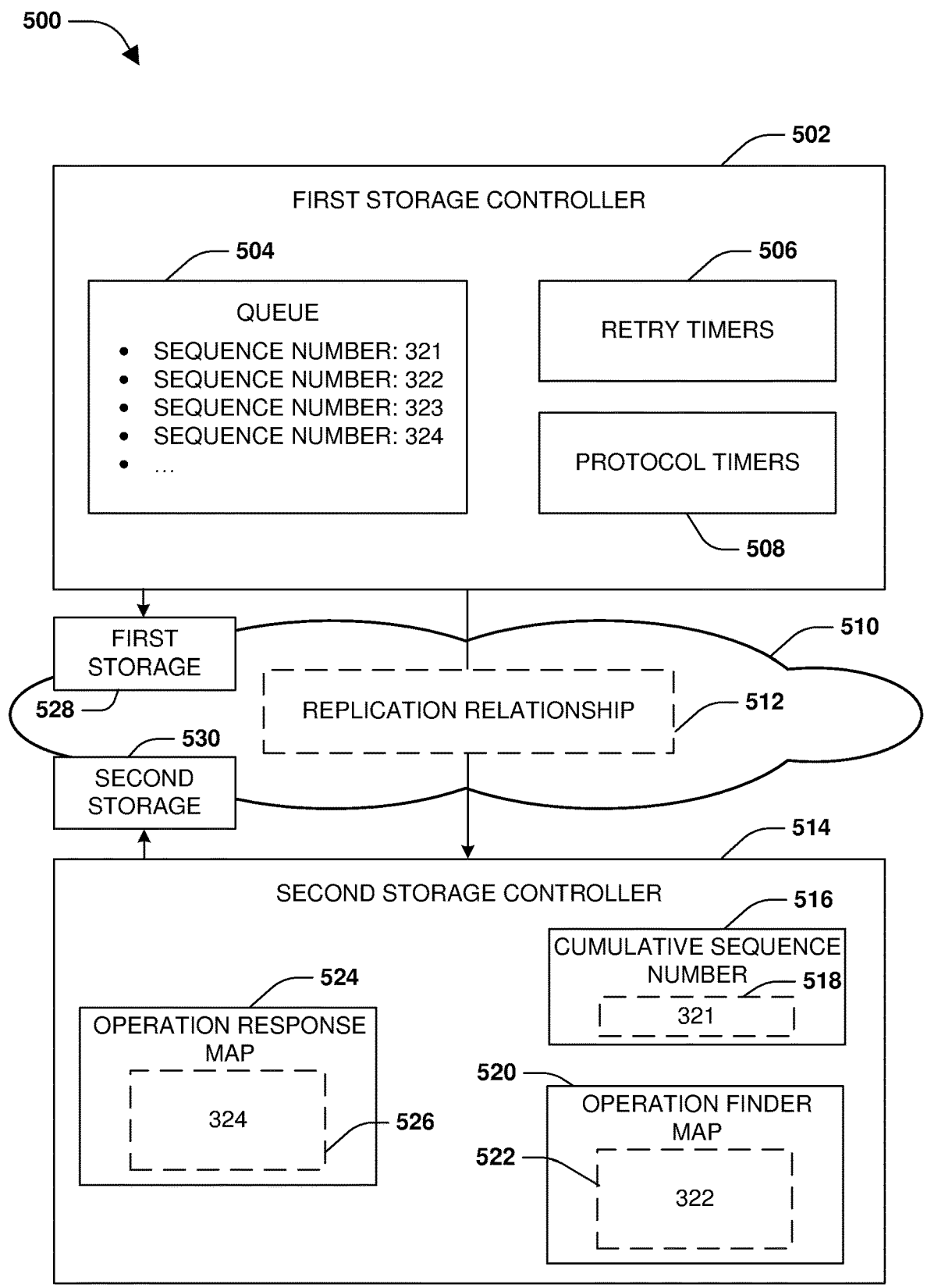
FIG. 5A is a component block diagram illustrating an exemplary computing device for resilient replication of storage operations, where first storage has a replication relationship with second storage.

FIGS. 5A-5G illustrate examples of a system 500 for resilient replication of storage operations. FIG. 5A illustrates a first storage controller 502 connected to a second storage controller 514 over a network 510. The first storage controller 502 may host first storage 528 (e.g., a file, a LUN, a subdirectory, a volume, etc.) having a replication relationship 512 with second storage 530 hosted by the second storage controller 514. The first storage controller 502 may maintain a queue 504 of sequence numbers assign to storage operations and replication operations (e.g., an original replication operation or retry replication operations of the original replication operation) of such storage operations. For example, replication operations of storage operations, assigned sequence numbers 321, 322, 323, and 324, may be currently awaiting acknowledgment from the second storage controller 514 of successful implementation.

In an example, a first replication operation 518, assigned the sequence number 321, may be a latest replication operation implemented in sequence by the second storage controller 514, and thus a cumulative sequence number 516 may be assigned the sequence number 321. A second replication operation 522, assigned the sequence number 322, may be currently being implemented by the second storage controller 514 upon the second storage 530, and thus the sequence number 322 may be specified within an operation finder map 520. A third replication operation 521, assigned the sequence number 323, may have been lost due to a transient network issue with the network 510 (e.g., a packet loss). A fourth replication operation 526, assigned the sequence number 324, may have been implemented by the second storage controller 514 upon the second storage 530 in an out of sequence order with respect to the cumulative sequence number 516 of 321 because the sequence number 324 is not next in sequence with respect to 321, and thus the sequence number 324 may be specified within an operation response map 524.

The first storage controller 502 may maintain retry timers 506 for replication operations because transient network issues and/or other failures (e.g., communication loss, a storage controller failure, etc.) may result in replication operations not being implemented by the second storage controller 514, thus resulting in data inconsistency between the first storage 528 and the second storage 530. Responsive to a retry timer timing out before an acknowledgment is received from the second storage controller 514 that a replication operation succeeded, a retry replication operation of the replication operation may be sent to the second storage controller 514 for implementation. The retry replication operation may be assigned the sequence number of the replication operation.

The first storage controller 502 may maintain protocol timers 508 for replication operations. Responsive to a protocol timer timing out before a success acknowledgment is received from the second storage controller 514 for a sequence number (e.g., before an acknowledgement that an original replication operation or a retry replication operation of the original replication operation succeeded), the synchronous replication relationship may be taken out of sync.

Figure 5B:
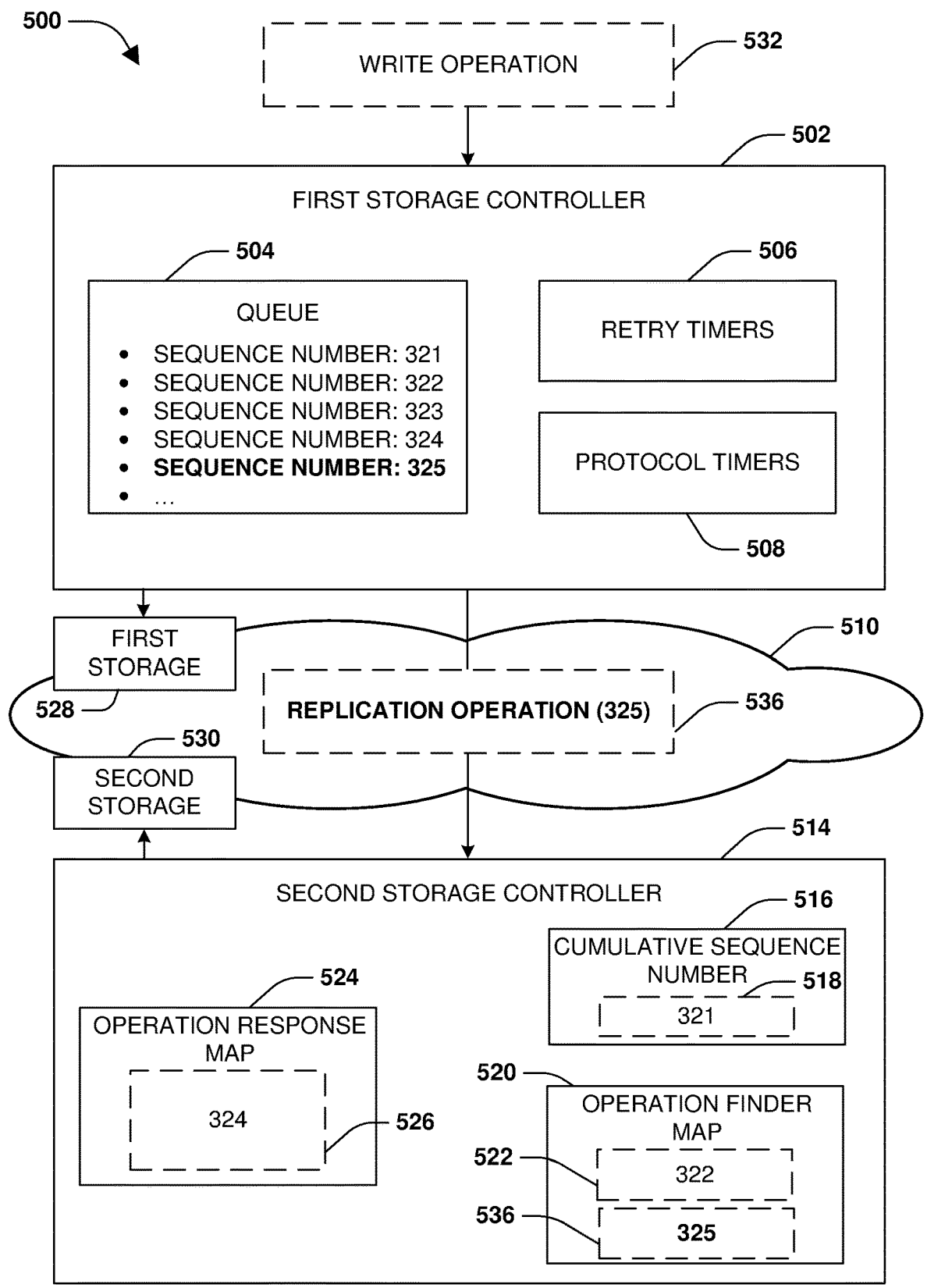
FIG. 5B is a component block diagram illustrating an exemplary computing device for resilient replication of storage operations, where a replication operation, of a storage operation, is sent to a second storage controller for implementation.

FIG. 5B illustrates the first storage controller 502 receiving a storage operation 532. The first storage controller 502 may assign a sequence number 325 to the storage operation 532. The first storage controller 502 may create a fifth replication operation 536 based upon the storage operation 532, and may assign the sequence number 325 to the replication operation 536. The first storage controller 502 may send the replication operation 536 to the second storage controller 514 for implementation upon the second storage 530. The first storage controller 502 may locally implement the storage operation 532 upon the first storage 528. Responsive to the second storage controller 514 determining that the fifth replication operation 536 should be implemented upon the second storage 530 (e.g., the sequence number 325 is greater than the cumulative sequence number 516 of 321 and is not specified within the operation response map 524 nor the operation finder map 520), the sequence number 325 of the fifth replication operation 536 may be specified as a new entry within the operation finder map 520.

Figure 5C:
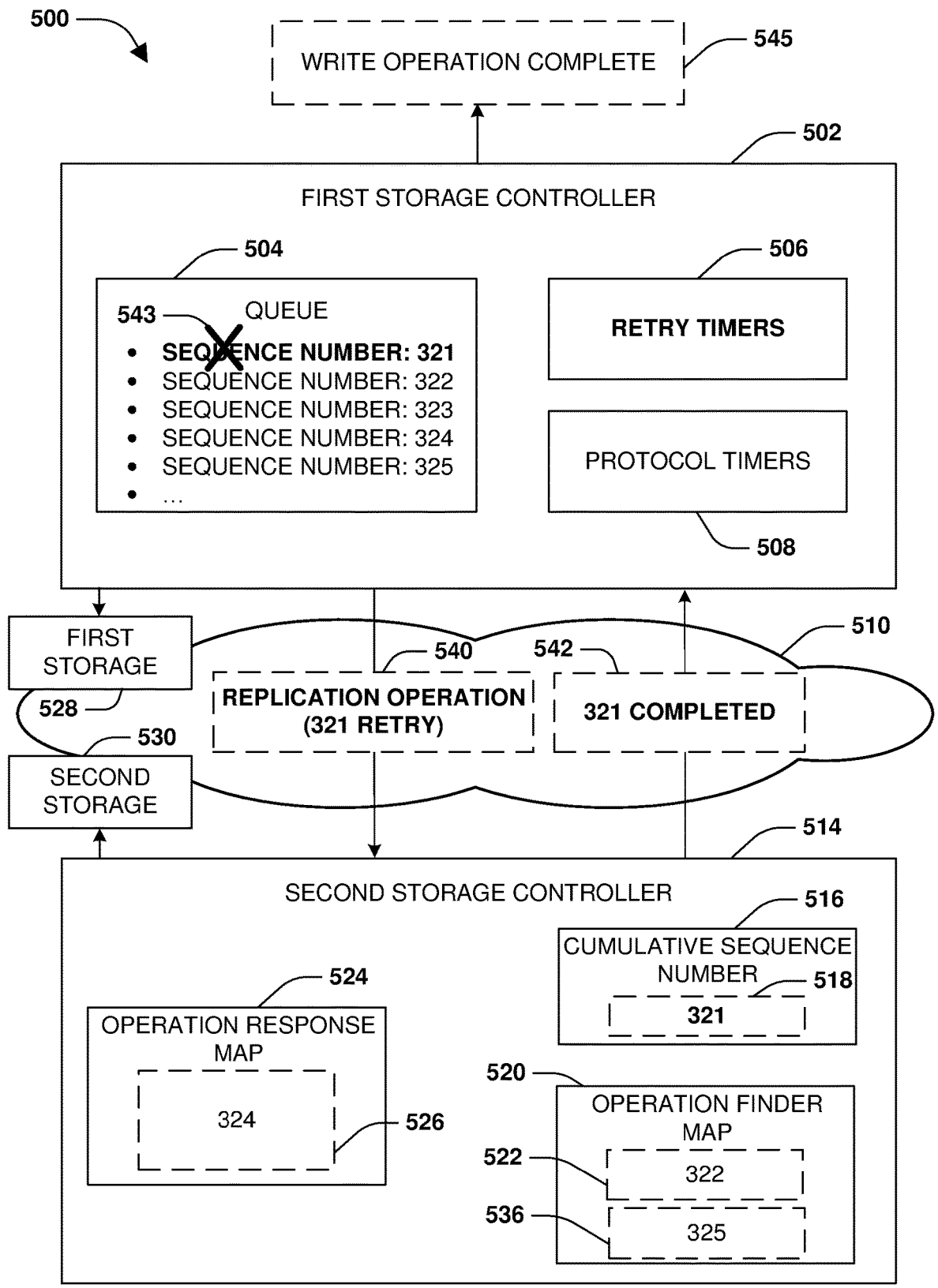
FIG. 5C is a component block diagram illustrating an exemplary computing device for resilient replication of storage operations, where a replication operation, that is a retry of a first replication operation already implemented in sequential order, is sent to a second storage controller for implementation.

FIG. 5C illustrates the second storage controller 514 receiving a replication operation 540 that is a retry of the first replication operation 518 assigned to the sequence number 321. For example, a retry timer may timeout before an acknowledgement is received from the second storage controller 514 that the first replication operation 518 succeeded (e.g., an acknowledgment message may have been lost due to a network issue), and thus the replication operation 540 may be generated and sent to the second storage controller 514. Because the sequence number 321, of the replication operation 540 that is the retry of the first replication operation 518, is less than or equal to the cumulative sequence number of 321 (e.g., the sequence number 321 is equal to 321), the replication operation 540 may be terminated and a response 542 may be provided back to the first storage controller 502 that replication operation implementation for the sequence number 321 succeeded (e.g., the first replication operation 518 succeeded). Accordingly, the first storage controller 502 may remove 543 the sequence number 321 from the queue 504 and a storage operation complete message 545 may be provided back to a client.

Figure 5D:
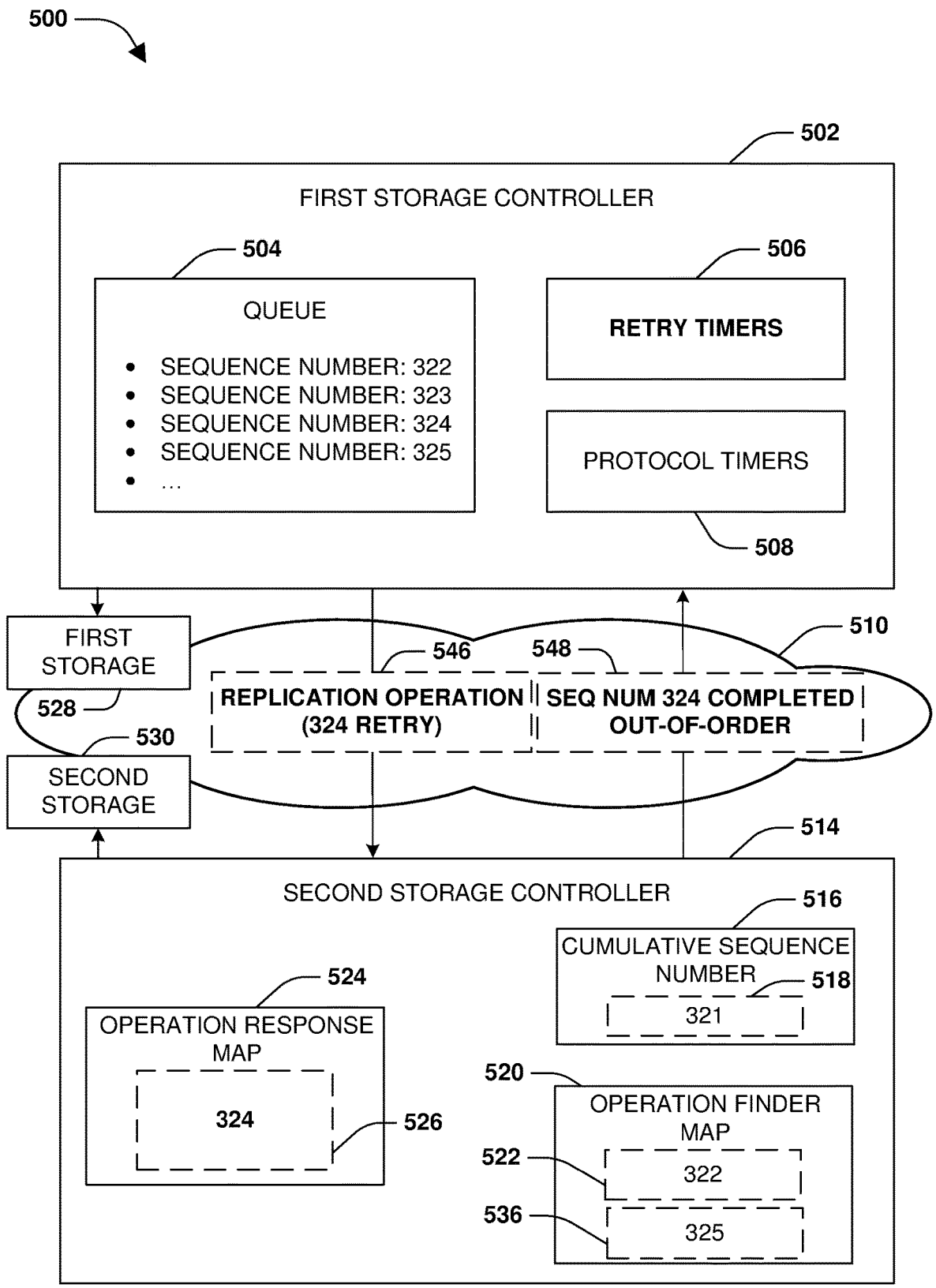
FIG. 5D is a component block diagram illustrating an exemplary computing device for resilient replication of storage operations, where a replication operation, that is a retry of a fourth replication operation already implemented in out of order sequence, is sent to a second storage controller for implementation.

FIG. 5D illustrates the second storage controller 514 receiving a replication operation 546 that is a retry of the fourth replication operation 526 assigned to the sequence number 324. For example, a retry timer may timeout before an acknowledgement is received from the second storage controller 514 that the fourth replication operation 526 succeeded, and thus the replication operation 546 may be generated and sent to the second storage controller 514. Because the sequence number 324, of the replication operation 546 that is the retry of the fourth replication operation 526, is greater than the cumulative sequence number of 321 (e.g., the sequence number 324 is greater than 321) and is specified within the operation response map 524 that tracks replication operations implemented out of order, the replication operation 546 may be terminated and a response 548 may be provided back to the first storage controller 502 that replication operation implementation for the sequence number 324 succeeded (e.g., the fourth replication operation 526 succeeded in an out of order sequence).

Figure 5E:
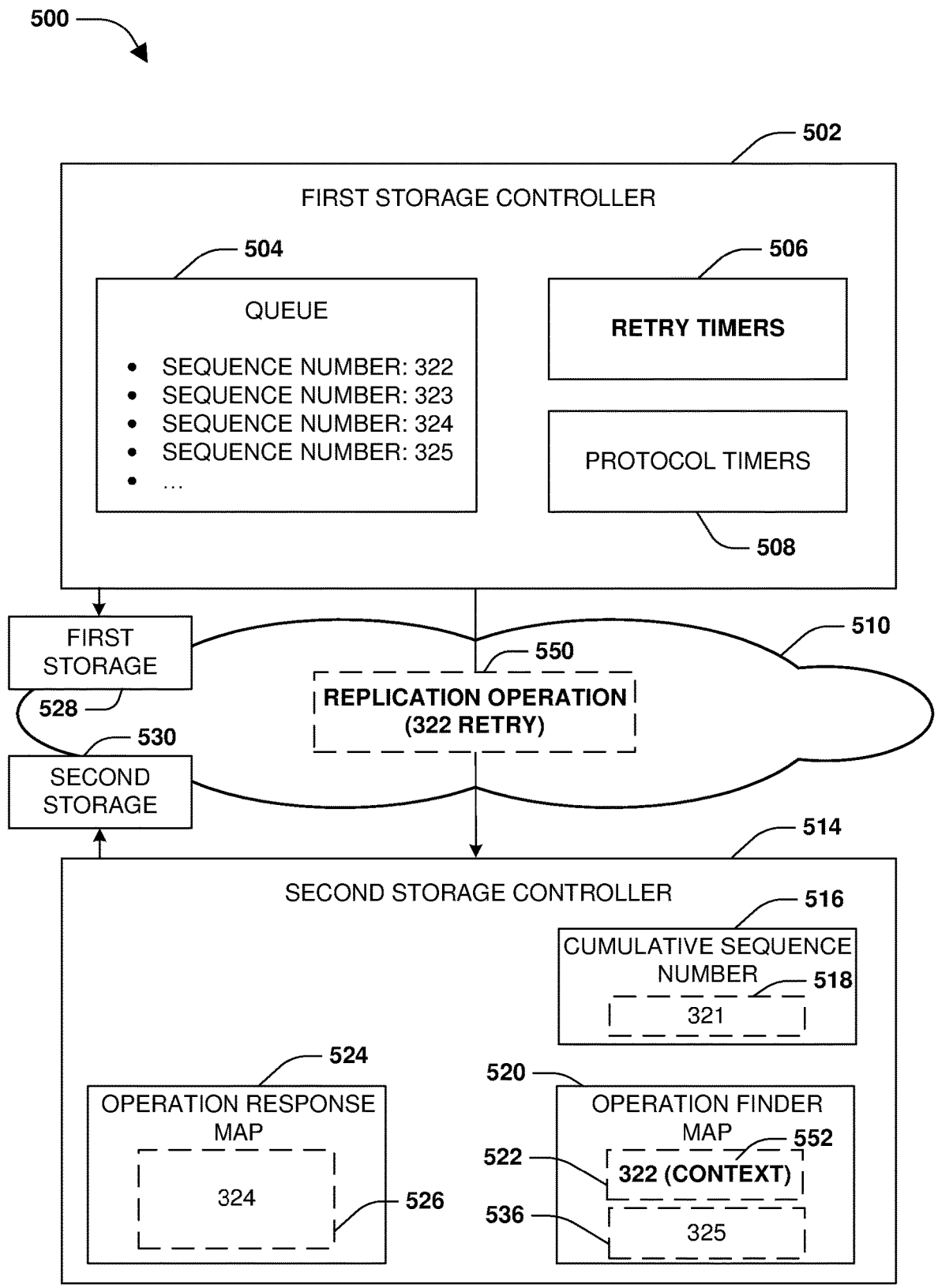
FIG. 5E is a component block diagram illustrating an exemplary computing device for resilient replication of storage operations, where a replication operation, that is a retry of a second replication operation currently being implemented by a second storage controller, is sent to the second storage controller for implementation.
Figure 5F:
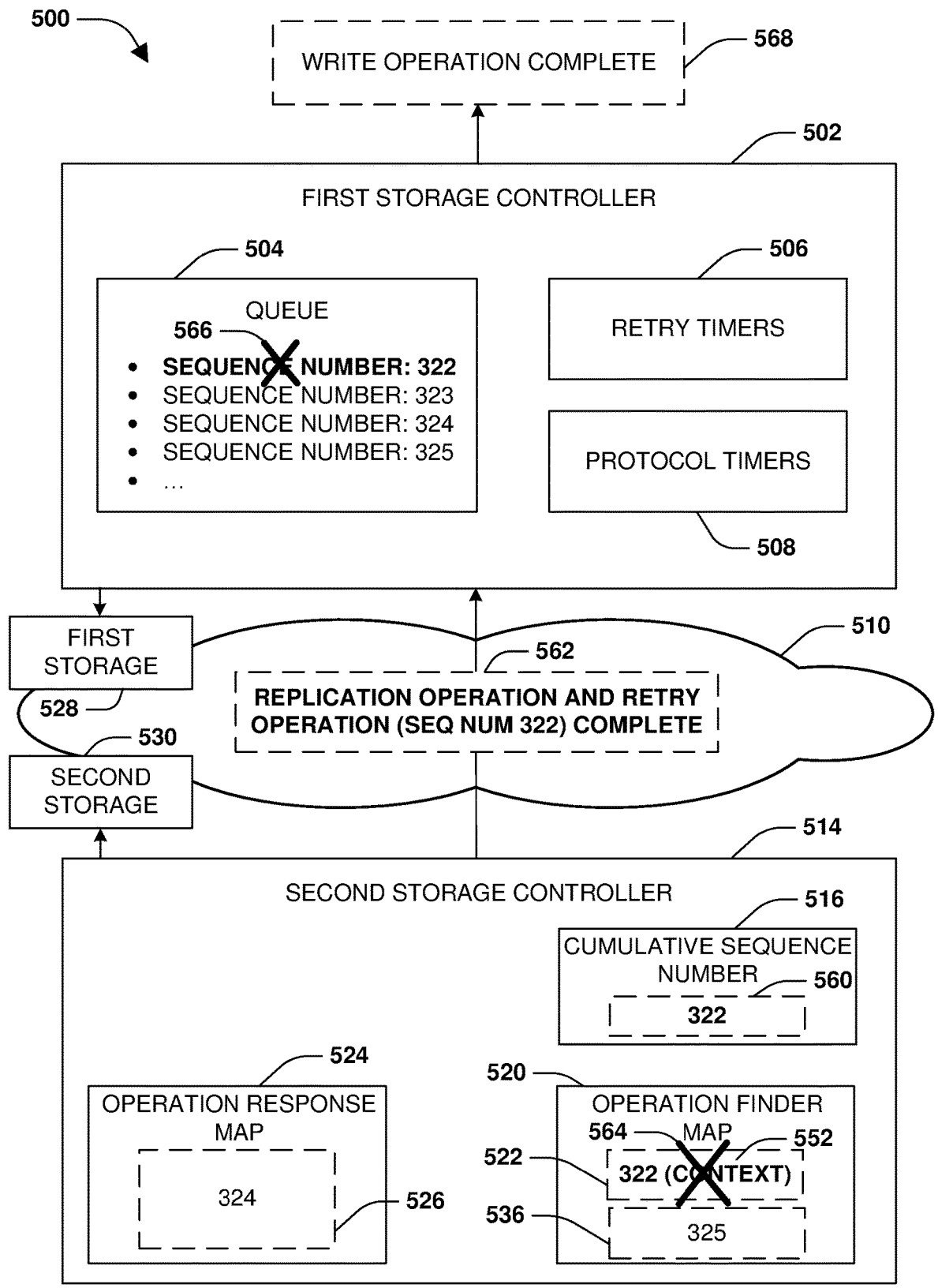
FIG. 5F is a component block diagram illustrating an exemplary computing device for resilient replication of storage operations, where a second storage controller sends a message to a first storage controller that replication operation implementation for a sequence number has succeed.

FIG. 5E illustrates the second storage controller 514 receiving a replication operation 550 that is a retry of the second replication operation 522 assigned to the sequence number 322. For example, a retry timer may timeout before an acknowledgement is received from the second storage controller 514 that the second replication operation 522 succeeded, and thus the replication operation 550 may be generated and sent to the second storage controller 514. Because the sequence number 322, of the replication operation 550 that is the retry of the second replication operation 522, is specified within an entry of the operation finder map 520 (e.g., the second replication operation 522 may be currently being implemented by the second storage controller 514 upon the second storage 530), a context 552 of the replication operation 550 may be added to the entry for the second replication operation 522. FIG. 5F illustrates the second replication operation 522 being completed. An acknowledgment 562 is provided back to the first storage controller 502, based upon the entry and the context 552, that replication operation implementation for the sequence number 322, corresponding to the second replication operation 522 and the replication operation 550 that is the retry of the second replication operation 522, succeeded. Because a context associated with the second replication operation 522 may have expired from an underlying network transport, the first storage controller 502 may merely receive an acknowledgment for the replication operation 550 that is the retry of the second replication operation 522. Accordingly, the entry for the second replication operation 522 may be removed 564 from the operation finder map 520 and the sequence number 322 may be removed 566 from the queue 504. A storage operation complete message 568 may be provided back to a client.

Figure 5G:
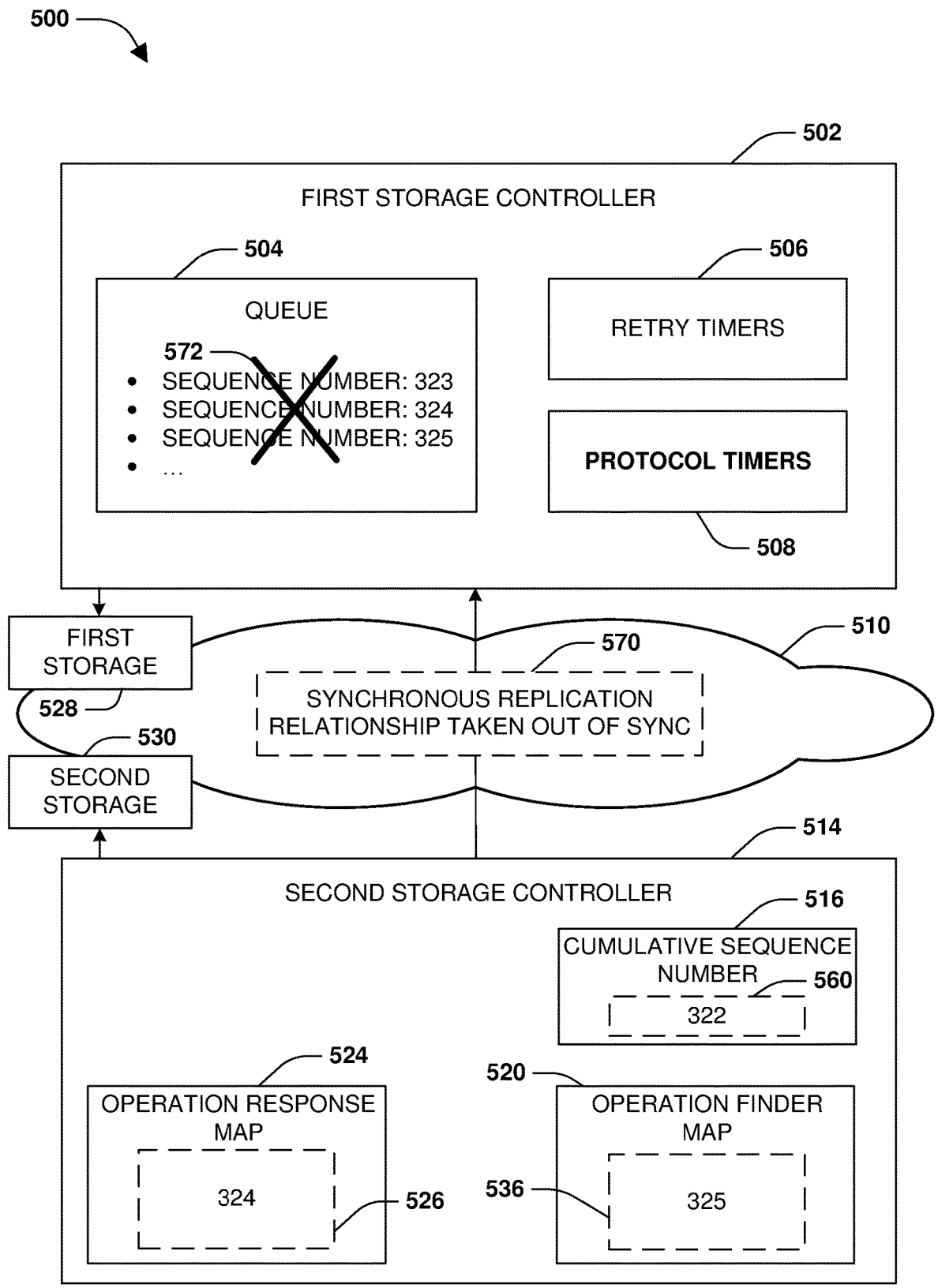
FIG. 5G is a component block diagram illustrating an exemplary computing device for resilient replication of storage operations, where a protocol timer times out.

FIG. 5G illustrates the first storage controller 502 determining that a protocol timer for the sequence number 323, assigned to the third replication operation 521, has timed out. Accordingly, the first storage control 502 may flush 572 the queue 504, and the synchronous replication relationship may be taken out of sync 570.

Figure 6:
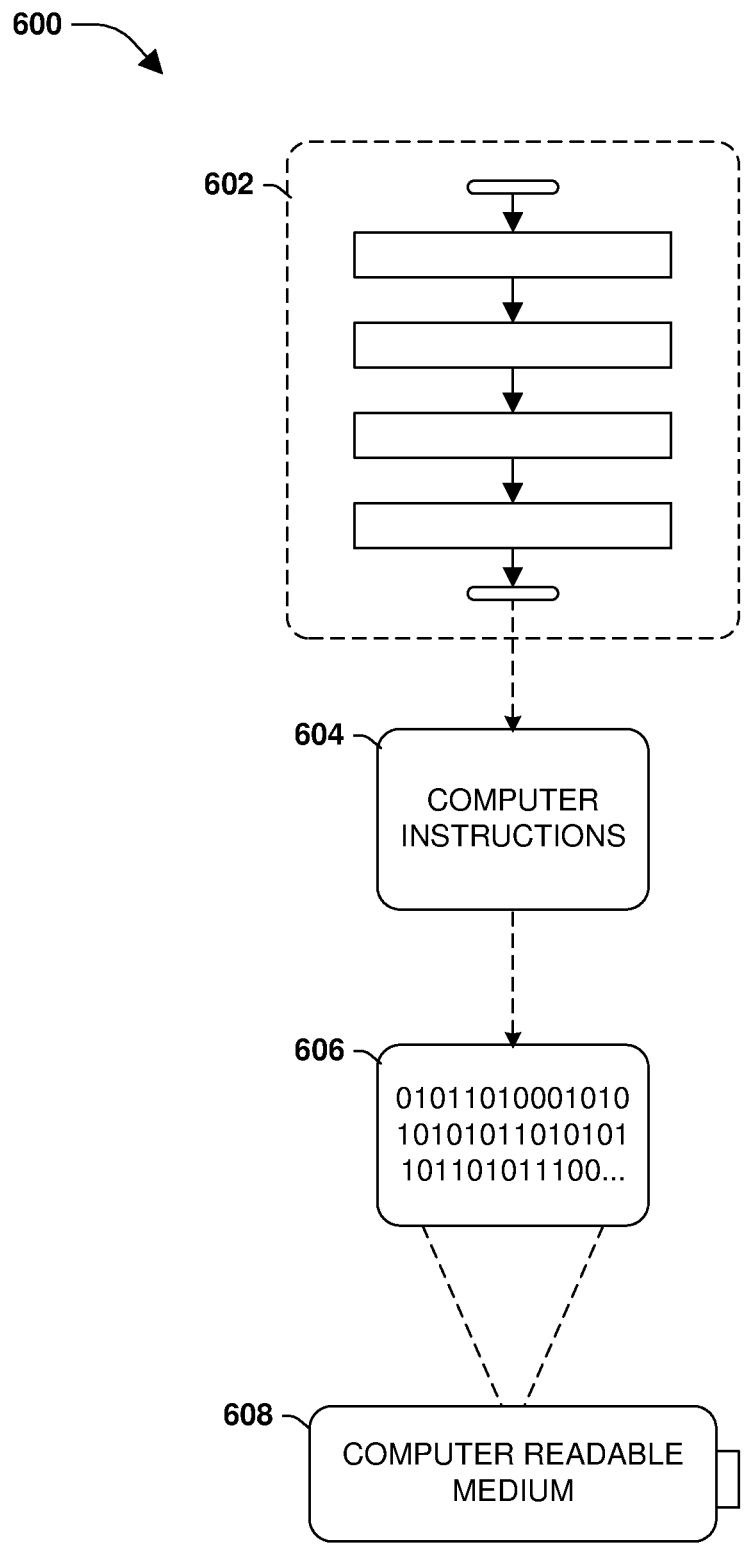
FIG. 6 is an example of a computer readable medium in accordance with one or more of the provisions set forth herein.

Still another embodiment involves a computer-readable medium comprising processor-executable instructions configured to implement one or more of the techniques presented herein. An example embodiment of a computer-readable medium or a computer-readable device that is devised in these ways is illustrated in FIG. 6, wherein the implementation 600 comprises a computer-readable medium 608, such as a CD-R, DVD-R, flash drive, a platter of a hard disk drive, etc., on which is encoded computer-readable data 606. This computer-readable data 606, such as binary data comprising at least one of a zero or a one, in turn comprises a processor-executable computer instructions 604 configured to operate according to one or more of the principles set forth herein. In some embodiments, the processor-executable computer instructions 604 are configured to perform a method 602, such as at least some of the exemplary method 300 of FIG. 3 and/or at least some of the exemplary method 400 of FIG. 4, for example. In some embodiments, the processor-executable computer instructions 604 are configured to implement a system, such as at least some of the exemplary system 500 of FIGS. 5A-5G, for example. Many such computer-readable media are contemplated to operate in accordance with the techniques presented herein.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), EEPROM and/or flash memory, CD-ROMs, CD-Rs, CD-RWs, DVDs, cassettes, magnetic tape, magnetic disk storage, optical or non-optical data storage devices and/or any other medium which can be used to store data.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method comprising:
executing, by a second device, a first replication operation received from a first device as a replica of an original operation executed by the first device, the original operation and the first replication operation assigned a first sequence number, wherein the first replication operation is a replica of a storage operation executed by the first device;
adding an entry into an operation response map to indicate that the first replication operation was performed out of sequence based upon the first sequence number being out of sequence with respect to a cumulative sequence number;
determining that a second replication operation is a retry of the already executed first replication operation based upon the second replication operation being assigned the first sequence number specified within the entry of the operation response map;
terminating the second replication operation received from the first device based upon the second replication operation being the retry of the first replication operation, wherein the second replication operation is a replica of the storage operation executed by the first device;
transmitting a response to the first device that the first replication operation was executed; and
increasing an amount of resources provisioned for executing replication operations based upon an increasing gap between the cumulative sequence number and a largest sequence number of replication operations executed by the second device.

2. The method of claim 1, comprising:
adding a new entry of a second sequence number of a replication operation into an operation finder map and executing the replication operation based upon the second sequence number not being specified within the operation response map and not being associated with at least one entry within the operation finder map.

3. The method of claim 1, comprising:
terminating the second replication operation and responding to the first device that replication operation implementation for the first sequence number succeeded based upon the first sequence number being less than the cumulative sequence number.

4. The method of claim 2, wherein the operation finder map corresponds to replication operations currently being executed by the second device.

5. The method of claim 4, comprising:
utilizing the cumulative sequence number, the operation response map, and the operation finder map to enforce a single write semantic for second storage associated with the second device.

6. The method of claim 1, comprising:
utilizing the cumulative sequence number to enforce a write order consistency for replication operations.

7. The method of claim 1, comprising:
determining that a third replication operation is a retry of a replication operation executed by the second device in sequential order based upon a sequence number of the third replication operation being less than the cumulative sequence number.

8. The method of claim 1, comprising:
evaluating the gap to determine a memory footprint corresponding to memory used to store replication operations received out of order and stored in the memory until ready for sequential execution.

9. The method of claim 1, wherein the storage operation comprises a modification to an attribute of a volume.

10. The method of claim 1, comprising:
adding a context of a third replication operation having a second sequence number to an entry associated with the second sequence number within an operation finder map based upon the second sequence number not being specified within the operation response map and the second sequence number being greater than the cumulative sequence number, wherein the context specifies that the third replication operation is a retry of a replication operation currently being implemented by the second device.

11. The method of claim 1, comprising:
incrementing the cumulative sequence number based upon a current replication operation being completed and a current sequence number of the current replication operation being next in sequence to the cumulative sequence number.

12. The method of claim 1, comprising:
adding a current sequence number of a replication operation to the operation response map based upon the replication operation being completed and the current sequence number not being next in sequence to the cumulative sequence number.

13. The method of claim 1, comprising:
executing an error handling operation based upon the gap exceeding a threshold.

14. The method of claim 1, comprising:
identifying a memory footprint utilized for replication operations based upon the gap.

15. The method of claim 1, comprising:
adjusting the amount of resources provisioned for executing replication operations based upon the gap indicating a change in an amount of memory used to store out of sequence replication operations waiting to be ready for sequential execution.

16. The method of claim 1, comprising:
implementing a cleanup action based upon the gap exceeding a threshold.

17. A non-transitory machine readable medium having stored thereon instructions for performing a method comprising machine executable code which when executed by at least one machine, causes the machine to:
execute, by a second device, a first replication operation received from a first device as a replica of an original operation executed by the first device, the original operation and the first replication operation assigned a first sequence number, wherein the first replication operation is a replica of a storage operation executed by the first device;
add an entry into an operation response map to indicate that the first replication operation was performed out of sequence based upon the first sequence number being out of sequence with respect to a cumulative sequence number;
determine that a second replication operation is a retry of the already executed first replication operation based upon the second replication operation being assigned the first sequence number specified within the entry of the operation response map;

terminate the second replication operation received from the first device based upon the second replication operation being the retry of the first replication operation, wherein the second replication operation is a replica of the storage operation executed by the first device;

transmit a response to the first device that the first replication operation was executed; and increase an amount of resources provisioned for executing replication operations based upon an increasing gap between the cumulative sequence number and a largest sequence number of replication operations executed by the second device.

18. The non-transitory machine readable medium of claim 17, wherein the machine executable code causes the machine to:

evaluate the gap to determine a memory footprint corresponding to memory used to store replication operations received out of order and stored in the memory until ready for sequential execution.

19. The non-transitory machine readable medium of claim 18, wherein the machine executable code causes the machine to:

execute an error handling operation based upon the gap exceeding a threshold.

20. A computing device comprising:

a memory comprising machine executable code; and a processor coupled to the memory, the processor configured to execute the machine executable code to cause the processor to:

execute, by a second device, a first replication operation received from a first device as a replica of an original operation executed by the first device, the original operation and the first replication operation assigned a first sequence number, wherein the first replication operation is a replica of a storage operation executed by the first device;

add an entry into an operation response map to indicate that the first replication operation was performed out of sequence based upon the first sequence number being out of sequence with respect to a cumulative sequence number;

determine that a second replication operation is a retry of the already executed first replication operation based upon the second replication operation being assigned the first sequence number specified within the entry of the operation response map;

terminate the second replication operation received from the first device based upon the second replication operation being the retry of the first replication operation, wherein the second replication operation is a replica of the storage operation executed by the first device; and transmit a response to the first device that the first replication operation was executed; and increase an amount of resources provisioned for executing replication operations based upon an increasing gap between the cumulative sequence number and a largest sequence number of replication operations executed by the second device.

\* \* \* \* \*